US009361817B2

(12) United States Patent
Trongone

(10) Patent No.: US 9,361,817 B2
(45) Date of Patent: Jun. 7, 2016

(54) REMOVABLE PERSONALIZED SEAT MARKER AND SYSTEM AND METHOD FOR IMPLEMENTING SAME

(71) Applicant: Stephen M. Trongone, Patterson, NJ (US)

(72) Inventor: Stephen M. Trongone, Patterson, NJ (US)

( * ) Notice: Subject to any disclaimer, the term of this patent is extended or adjusted under 35 U.S.C. 154(b) by 77 days.

(21) Appl. No.: 14/481,431

(22) Filed: Sep. 9, 2014

(65) Prior Publication Data

US 2015/0090778 A1 Apr. 2, 2015

Related U.S. Application Data

(63) Continuation-in-part of application No. 29/498,575, filed on Aug. 5, 2014.

(60) Provisional application No. 61/885,798, filed on Oct. 2, 2013.

(51) Int. Cl.

| | |
|---|---|
| ***G06F 17/00*** | (2006.01) |
| ***G09F 23/00*** | (2006.01) |
| ***G09F 3/00*** | (2006.01) |
| ***G09F 3/02*** | (2006.01) |
| ***G09F 3/18*** | (2006.01) |
| ***A47C 7/42*** | (2006.01) |
| ***A47C 1/13*** | (2006.01) |

(52) U.S. Cl.

CPC . *G09F 23/00* (2013.01); *A47C 1/13* (2013.01); *A47C 7/425* (2013.01); *G09F 3/02* (2013.01); *G09F 3/0297* (2013.01); *G09F 3/185* (2013.01); *G09F 2023/005* (2013.01)

(58) Field of Classification Search

USPC .......................... 235/375, 385; 705/5; 40/320

See application file for complete search history.

(56) References Cited

U.S. PATENT DOCUMENTS

| | | | | |
|---|---|---|---|---|
| 3,283,433 | A | 11/1966 | Navariono | |
| 3,702,034 | A | 11/1972 | Pfeiffer | |
| 6,076,211 | A * | 6/2000 | Chatman | 5/653 |
| 6,840,420 | B1 * | 1/2005 | Hudson | 224/669 |
| 6,899,391 | B1 * | 5/2005 | Schneller et al. | 297/252 |
| 7,121,621 | B1 * | 10/2006 | Starheim et al. | 297/188.04 |
| 2003/0066883 | A1 * | 4/2003 | Yu | 235/382 |

(Continued)

*Primary Examiner* — Ahshik Kim

(74) *Attorney, Agent, or Firm* — Kelley Drye & Warren LLP

(57) ABSTRACT

A removable personalized seat marker assembly that is temporarily installed on the user's seat at an event to personalize the user's seat. The user may easily remove the seat marker assembly and keep it as memorabilia of the event. The removable seat marker assembly comprises a personalized marker that enhances the experience of attending an event by allowing the user to customize their seat at the event by choosing from a variety of templates, personal user information, or event information, such as user's name, and/or the event name, date, and/or place. The seat marker assembly comprises a body having a front panel and a rear panel forming at least one enclosed compartment therein. The body comprises one or more attachment portions for installing the seat marker assembly to a seat. The front panel of the body comprises a clear window for displaying a personalized marker printed with information about the user and the event. The personalized marker may further comprise a machine-readable medium, wherein upon scanning the machine-readable medium at the event with a communication device of the user, the user may access, via a mobile phone application or website, information associated with the event, the user, the personalized marker, or any combination thereof.

24 Claims, 12 Drawing Sheets

(56) References Cited

U.S. PATENT DOCUMENTS

2003/0213843 A1* 11/2003 Jackson ........................ 235/382
2004/0065726 A1* 4/2004 McGee et al. ................ 235/375
2014/0278592 A1* 9/2014 Giampapa ......................... 705/5

* cited by examiner

100

100

REMOVABLE PERSONALIZED SEAT MARKER AND SYSTEM AND METHOD FOR IMPLEMENTING SAME

CROSS-REFERENCE TO RELATED APPLICATIONS

This application is a continuation-in-part of U.S. patent application Ser. No. 29/498,575, filed Aug. 5, 2014, the entire contents of which are herein incorporated by reference. This application claims the benefit of Provisional Application No. 61/885,798, filed Oct. 2, 2013, the entire contents of which are herein incorporated by reference.

FIELD OF THE INVENTION

The present invention relates to the field of seat marking at entertainment events, and more particularly, to a removable seat marker for providing personalized experience at an entertainment event, as well as to a computerized system and method of implementing the personalized marker of the present invention.

BACKGROUND OF THE INVENTION

Conventional seating at events or entertainment venues, such as sporting events, are either unmarked or are marked by seat and/or section numbers alone—leaving each seat identical and/or similar to the other seats in the vicinity. As a result, the attendee's or event ticket holder's seat is basically identical in appearance to other seats at the venue, with no distinguishing characteristics and no provision for the enjoyment of the event, other than to provide sitting for the event. In addition, the attendee or ticket holder leaving the seat at the event has no effective way to indicate that the seat is occupied. This leaves the attendee or ticket holder to either abandon the seat, with the possibility that another may take the seat, or to leave a personal item on the seat.

There is therefore a need for a personalized seat marker that provides for the temporary customization of the attendee's or ticket holder's seat at the event, enabling the attendee or event holder to be a part of the event.

SUMMARY OF THE INVENTION

An object of the invention is to provide a novel and useful personalized seat marker for temporarily customizing the user's seat at an event.

Another object of the invention is to provide a removable seat marker for providing personalized experience at an entertainment event.

Another object of the invention is to provide a personalized seat marker that can be retained by the user as memorabilia of the event.

Another object of the invention is to provide a computerized system and method for creating and implementing the personalized marker of the present invention.

Another object of the invention is to provide a computerized system and method for providing additional personalized experience at or after the event.

According to a preferred embodiment, a seat marker assembly for personalizing a user's seat at an event comprises a body having a front panel and a rear panel forming at least one enclosed compartment therein, wherein the front panel comprises a clear window; at least one seat strap connected to the body for securing the body to the seat; an upper backrest attachment portion attached to an upper end of the body for securing the upper backrest attachment to an upper portion of a backrest of the seat; and a personalized marker displayed through the clear window, wherein the personalized marker is printed with information about the user and the event. The upper backrest attachment portion may be attached to the body via a pair of interconnected loops or a band. The body may further comprise one or more zippers disposed at the front panel, the rear panel, an upper end of the body, or a lower end of the body, to access the enclosed compartment. The window may encompass substantially the majority of the front panel to clearly display the personalized marker. The at least one seat strap may extend horizontally across the body from a first side to a second side of the body. Alternatively, the at least one seat comprises a pair of vertical straps extending vertically across the body from a lower side of the body to an upper side of the body or to the upper backrest attachment portion. The pair of vertical straps may be used to secure the seat marker assembly to the seat or may be used as shoulder straps for carrying the seat marker assembly by the user. The at least one seat strap may be removably attached to the body via pair of clips, buckles, female and male side-squeeze plastic buckles, snap buckles, hell bar buckles, release buckles, cam buckles, or any combination thereof. The at least one seat strap may adjusts in length and/or comprise an elastic material for securely installing the seat marker assembly to a seat. The seat marker assembly may further comprise at least one removable cushion within the at least one enclosed compartment for providing cushion to the user. The seat marker assembly may further comprise an internal storage bag accessible through a zipper located at a lower side of the body. The internal storage bag includes an enclosed compartment for retaining personal items and may be pulled out from the enclosed compartment of the body by unzipping the zipper at the lower side of the body. The body may further comprise an inner divider panel disposed between the front panel and the rear panel to divide the enclosed compartment into two separate compartments.

In a preferred embodiment, the upper backrest attachment portion is hook-shaped and radially extends from a first end to a second end. The upper backrest attachment portion may further comprise a measuring device having a channel located inside the upper backrest attachment portion, a first ruler portion extending from a first end of the channel, and a second ruler portion extending from a second end of the channel. The measuring device may further comprise a pulley to enable the first and second ruler portions to extend from the channel. The measuring device is used to center and stabilize the seat marker assembly on the seat. The seat marker assembly may further comprise removable shoulder straps for carrying the seat marker assembly to or from the event.

In a preferred embodiment, the personalized marker of the seat marker assembly comprises a machine-readable medium, such as a barcode, a two dimensional barcode (e.g., a QR Code®), a magnetic strip, a microchip, a transponder device, an RFID, or any combination thereof. The machine-readable medium may be scanned via a communication device of the user. The machine-readable medium may contains information about a website, wherein upon scanning the machine-readable medium with a communication device of the user, the communication device is directed to the website. Alternatively, or in addition, the machine-readable medium may contain information associated with a mobile phone application, wherein upon scanning the machine-readable medium with a communication device of the user, the communication device downloads the application. The website or mobile phone application may contain information associated with the event, the user, the personalized marker, or any combination thereof, thereby providing additional personalized experience at or after the event.

BRIEF DESCRIPTION OF THE DRAWINGS

A further understanding of the invention can be obtained by reference to a preferred embodiment set forth in the illustrations of the accompanying drawings. Although the illustrated embodiment is merely exemplary of systems and methods for carrying out the invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the invention, reference is now made to the following drawings in which.

DETAILED DESCRIPTION OF THE INVENTION

Figure 1A:
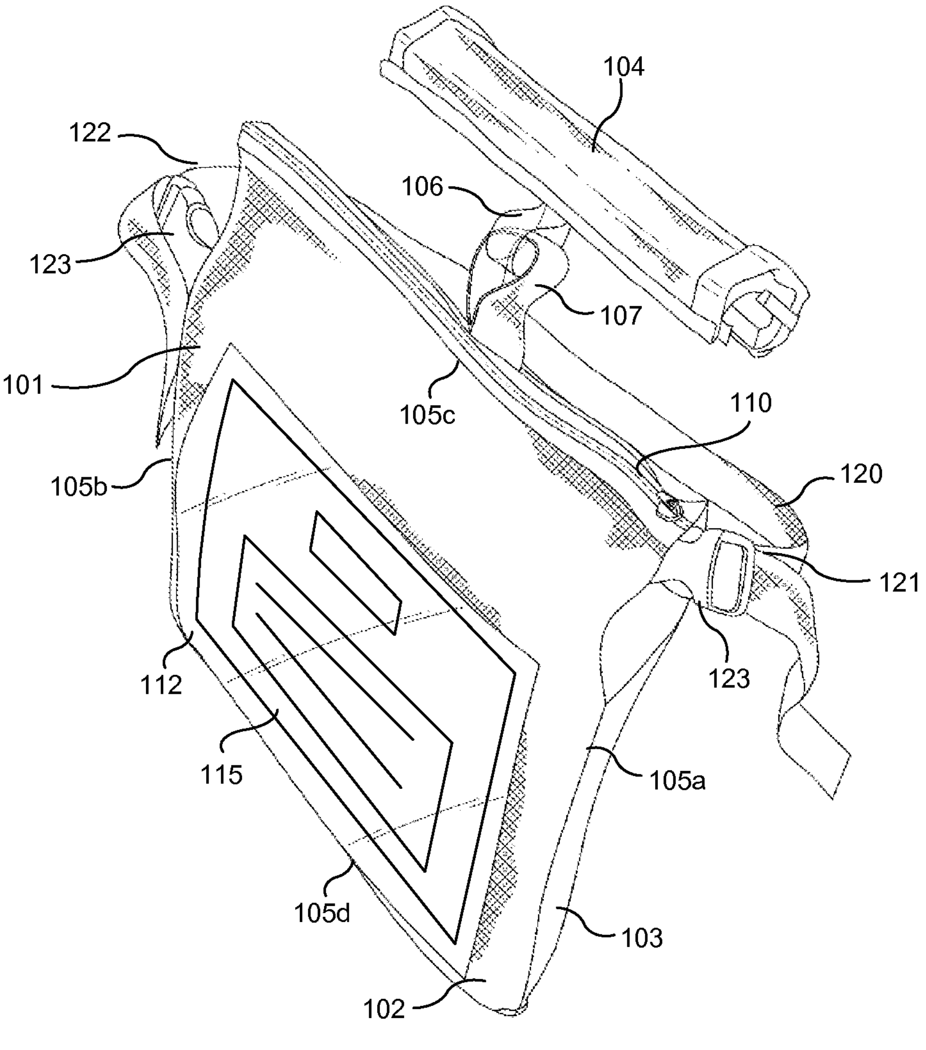
FIG. 1A is a front perspective view of a seat marker assembly according to an embodiment of the present invention.

The invention may be understood more readily by reference to the following detailed description of preferred embodiments of the invention. However, techniques, systems and operating structures in accordance with the invention may be embodied in a wide variety of forms and modes, some of which may be quite different from those in the disclosed embodiments. Consequently, the specific structural and functional details disclosed herein are merely representative, yet in that regard, they are deemed to afford the best embodiment for purposes of disclosure and to provide a basis for the claims herein, which define the scope of the invention. It must be noted that, as used in the specification and the appended claims, the singular forms “a”, “an”, and “the” include plural referents unless the context clearly indicates otherwise.

The present invention offers users a personalized seat marker as a time capsule of special events. The personalized seat marker removably marks the user’s seat at an event, such as a ticketed sporting event, allowing customization and/or personal occasion information to be published at the event. The personalized seat marker of the present invention may be retained by the user as memorabilia of the event, it may be reused at another event, and it is designed to provide functional collection of memories at or after the event. The interchangeable use of the personalized seat marker allows users to create and personalize their own future ventures using a website. In addition, the personalized seat marker allows a user to commemorate a special event. It is secured to a seat of an attendee at an event and is printed with personalized information to mark the user’s attendance at the special event. The marker may be used at any event, occasion, or venture including, but not limited to an a adult or children birthday party, graduation, airplane carry on, networking event, bachelor/bachelorette party, quince era, banquets, sorority/fraternity party, bar/bats mitzvah, speed dating event, baptism, celebrity party, sporting event, sweet 16 party, concert, theme party, confirmation, vacation, corporate event, wedding, seminar, corporate product launch, fundraiser, golf event, or the like. As is evidence, the advantages of the present invention includes, without limitation, the ability to customize the purchased/leased seat at an event based on the particular event, the venue guidelines, seat size, shape, color and material, and the user’s specifications.

Referring now to FIGS. 1A-1E, there is shown a front perspective view, a rear view, a left side view, a top view, and a bottom view, respectively, of a seat marker assembly 100 according to an embodiment of the present invention. Generally, seat marker assembly 100 comprises body 101 and an upper backrest attachment portion 104 for securing the seat marker assembly 100 to an upper portion of a backrest of a seat, as will be later described. Upper backrest attachment portion 104 may be attached to body 101 via a pair of interconnected loops 106 and 107. Alternatively, a band may be secured at its first end to the upper backrest attachment portion 104 and at its second and opposite end to body 101. The dimension of the seat marker assembly 100 is preferably 15 inches wide by 18 inches long, with the option of being extended to 22 inches long, as will be later described.

Body 101 comprises a front panel 102 attached to a rear panel 103. Front panel 102 is secured to the rear panel 103 at perimeter sides 105*a*-105*d* forming at least one internal compartment within body 101, as will be later described. In a preferred embodiment, front panel 102 is permanently secured to the rear panel 103 at the right side 105*a* and left side 105*b* via stitching. However, the panels, and other components of the seat marker assembly 100 may be secured via stitching, adhesives, heat fusion, or the like, or any combinations thereof. In a preferred embodiment, body 101, and the upper backrest attachment portion 104 comprise a durable and weather resistant material. For example, seat marker assembly 100 may comprise vinyl, polyester, durable canvas material, or the like.

The upper side 105*c* of body 101 preferably comprises an upper horizontal zipper 110. Lower side 105*d* of body 101 may also comprise a lower horizontal zipper 111 (shown in FIG. 1E). Alternatively, the front panel 102 and rear panel 103 may be permanently secured at the lower side 105*d* via stitching or other means as described above. Zippers 110 and 111 are used for accessing the internal compartments of the seat marker assembly 100. In alternative embodiments, body 101 may comprise vertical zippers, or zippers placed in other locations inside or outside of the body 101 to access internal compartments.

The front panel 102 of body 101 comprises a clear window 112 for display of a personalized marker 115 contained within an internal compartment of body 101. The clear window 112 preferably comprises a clear and flexible plastic material, such as clear vinyl (or PVC). However, other materials may be utilized without departing from the scope of the present invention. Window 112 preferably encompasses substantially the majority of front panel 102. In a preferred embodiment, window 112 is dimensioned 8 inches tall by 11 inches wide, although any other size may be utilized. Window 112 displays personalized information of the user and the event printed on personalized marker 115, as will be later described.

Seat marker assembly 100 further comprises at least one seat strap 120 for securing the seat marker assembly 100 to the backrest of a seat. Seat strap 120 extends horizontally across body 101 from a first end 121 to a second end 122. In a preferred embodiment, first end 121 of seat strap 120 removably attaches to side 105*a* of body 101 and second end 122 of seat strap 120 removably attaches to side 105*b* of body 101 via pair of clips or buckles 123. Clips 123 may comprise female and male side-squeeze plastic buckle, snap buckle, heel bar buckle, release buckle, cam buckle, or any other type of clip or buckle known in the art. Seat strap 120 preferably comprises elastic material for securely attaching the seat marker assembly 100 to a seat. Alternatively, or in addition, seat strap 120 may be adjustable in length via one or more buckles as is known in the art.

Figure 2:
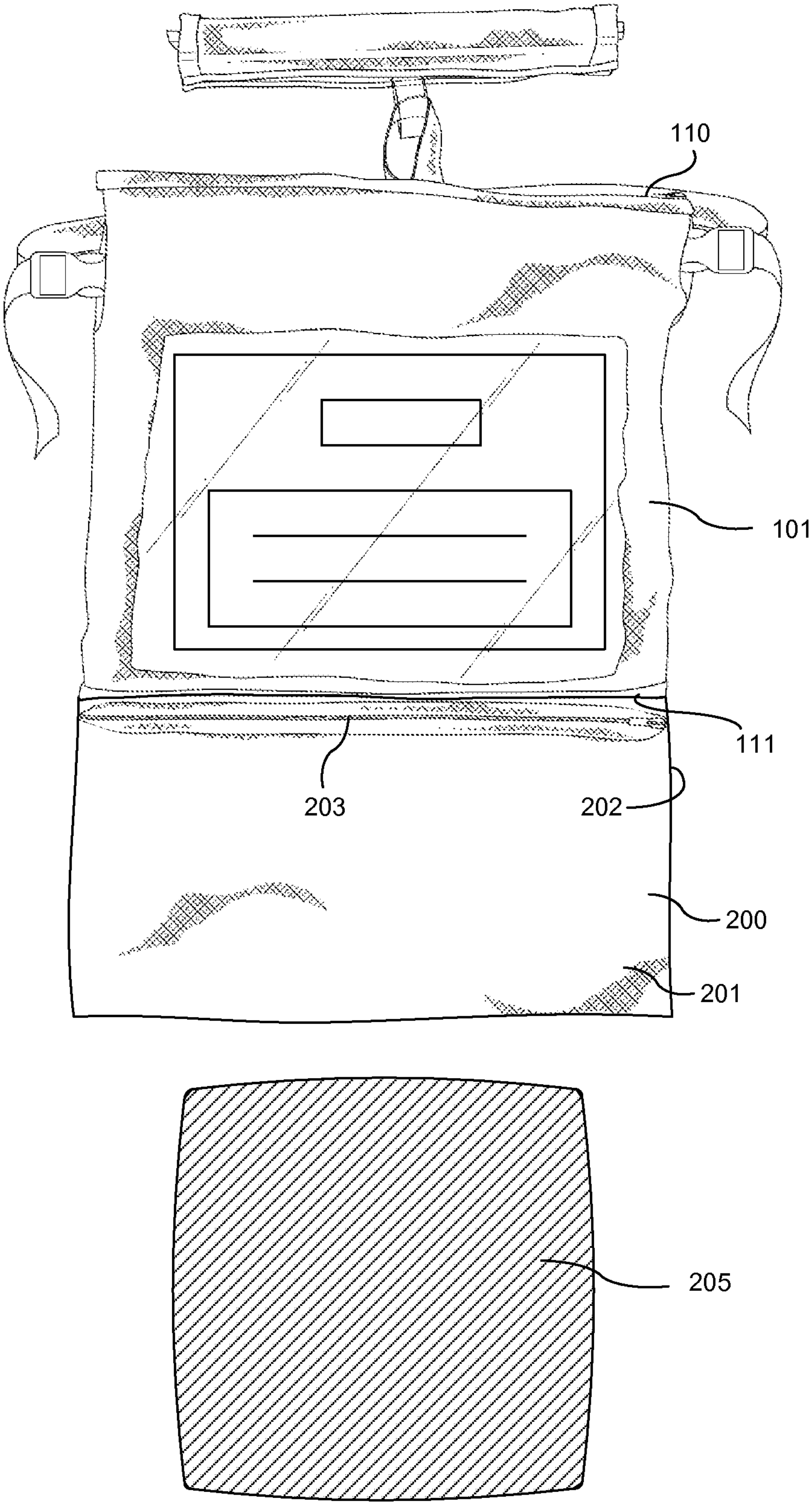
FIG. 2 is an expanded view of the seat marker assembly.

FIG. 2 shows an expanded view of the seat marker assembly 100. Seat marker assembly 100 may contain a cushion 205 within a compartment of body 101. Cushion 205 may remain within body 101 to provide comfort at the backrest of a seat. Alternatively, cushion 205 may be removed from the compartment in body 101 by unzipping upper horizontal zipper 110. Cushion 205 may then be used to cushion the seat. In another embodiment, seat marker assembly 100 may comprise two cushions, one for cushioning the backrest of the seat and another for cushioning the seat. In addition, the lower horizontal zipper 111 may be opened to pull out a storage bag 200. Storage bag 200 may comprise a front panel 201 and a rear panel 202 connected at three sides to form a compartment therein. Storage bag may further comprise a horizontal zipper 203 for accessing the compartment within the storage bag 200. Extending the storage bag 200 from body 101 adds an additional 4 inches in length to body 101 and preferably provides a 4 inch by 15 inch separate safety compartment. That compartment is designed to allow for safe keeping of personal items, such as cell phones, wallets, jewelry, etc. It is easily accessible from the outside of the seat marker assembly 100 via zipper 203.

Figure 1B:
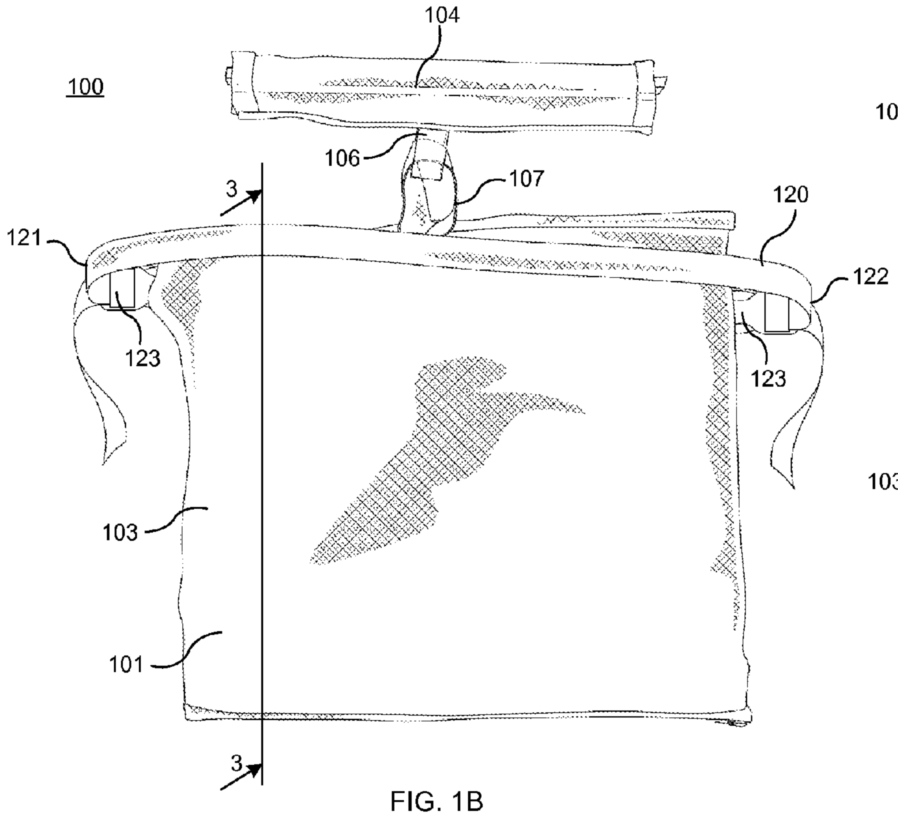
FIG. 1B is a rear view of the seat marker assembly.
Figure 1C:
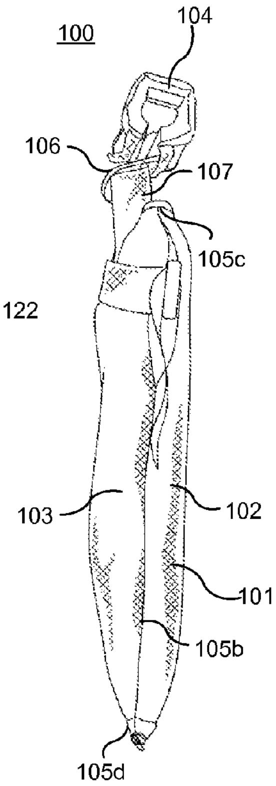
FIG. 1C is a left side view of the seat marker assembly.
Figure 1D:
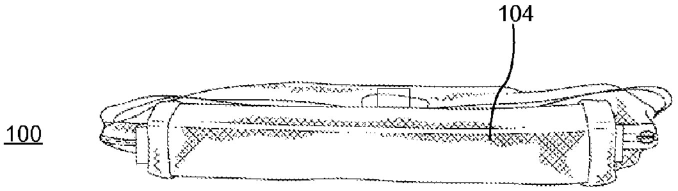
FIG. 1D is a top view of the seat marker assembly.
Figure 1E:
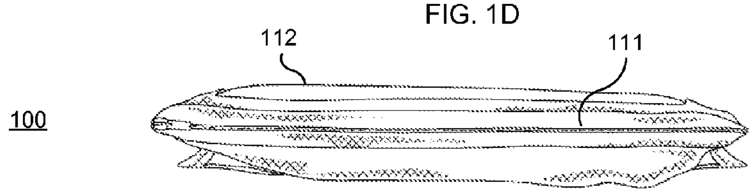
FIG. 1E is a bottom view of the seat marker assembly.
Figure 3:
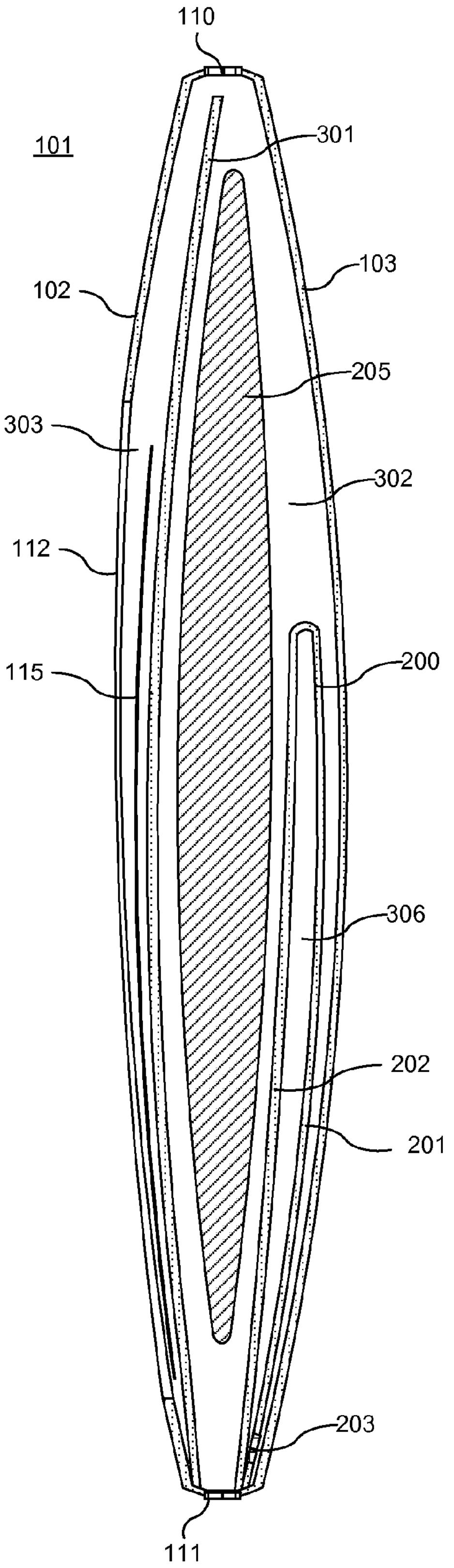
FIG. 3 is a cross sectional view of the view of the seat marker assembly.
Figure 4:
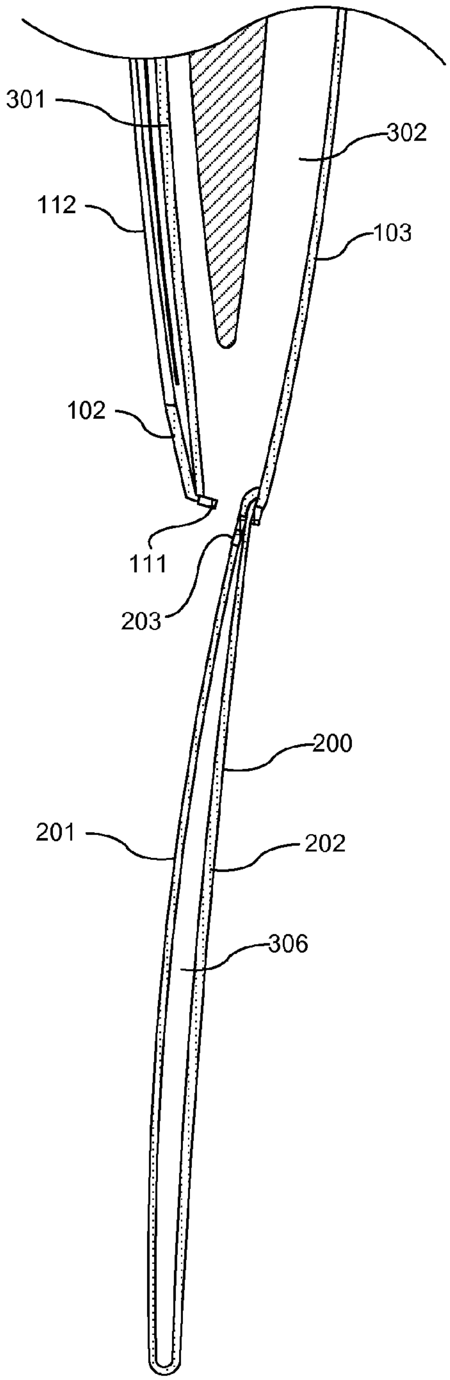
FIG. 4 is a cross sectional view of the seat marker assembly with an inner bag pulled out.

FIG. 3 illustrates cross sectional view of body 101 taken along line 3-3 in FIG. 1B. As shown in FIG. 3, body 101 comprises front outer panel 102 and rear outer panel 103. Front outer panel 102 comprises a clear window 112. Body 101 may further comprise an inner divider panel 301. Panel 301 divides the space within body 101 into two separate compartments—compartment 302 and compartment 303. Compartment 303 may house personalized marker 115 that may be seen from outside of body 101 via window 112. Compartment 303 may be accessed via opening upper horizontal zipper 110. Compartment 302 may house the cushion 205, which may be accessed via upper horizontal zipper 110 or via lower horizontal zipper 111. Compartment 302 may also contain the storage bag 200. Storage bag 200 may be taken out by unzipping the lower horizontal zipper 111 and pulling out the bag, as shown in FIG. 4. When pulled out, zipper 203 may be used to access the compartment 306 formed between front panel 201 and rear panel 202 of the storage bag 200. After contents are placed in storage bag 200, zipper 203 may be zipped up and storage bag 200 may be inserted back into compartment 302 of body 101. As such, any item placed inside the storage bag 200 will be unseen and safely stored when the compartment 306 is slipped back inside body 101 of seat marker assembly 100.

Figure 5:
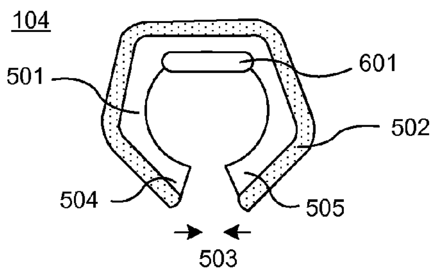
FIG. 5 is a cross sectional view of an upper backrest attachment portion of the seat marker assembly.

FIG. 5 illustrates a cross sectional view of upper backrest attachment portion 104. Upper backrest attachment portion 104 is hook shaped as to enable the upper back attachment portion 104 to be secured to the top portion of a backrest of a seat. Portion 104 may comprise a U-shape or a horseshoe shape as well. Portion 104 comprises an inner portion 501 that radially extends from a first end 504 to a second end 505. Inner portion 501 preferably comprises a material that retains its hooked shape—i.e., when first end 504 is pulled away from the second end 505 to secure the upper backrest attachment portion 104 to a backrest of a seat, the material of inner portion 501 causes the first end 504 to converge toward the second end 505 in directions 503. As such, the material of inner portion 501 causes the upper backrest attachment portion 104 to snugly secure around a backrest of a seat. In a preferred embodiment, inner portion 501 is made of polyethylene foam. Upper backrest attachment portion 104 further comprises an outer portion 502 secured around the inner portion 501 via stitching, adhesive, heat, or the like, or a combination thereof. Outer portion 502 may comprise the same material as body 101 of seat marker assembly 100.

Figure 6A:
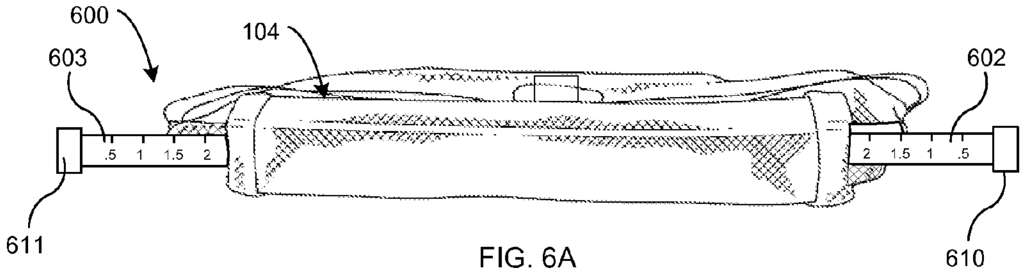
FIG. 6A is top view of a pull-out measuring device of the seat marker assembly.
Figure 6B:
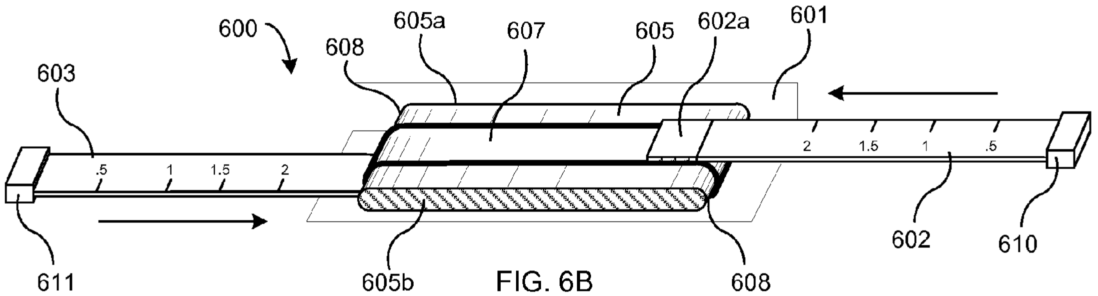
FIG. 6B is a perspective view of the pull-out measuring device of the seat marker assembly.
Figure 6C:
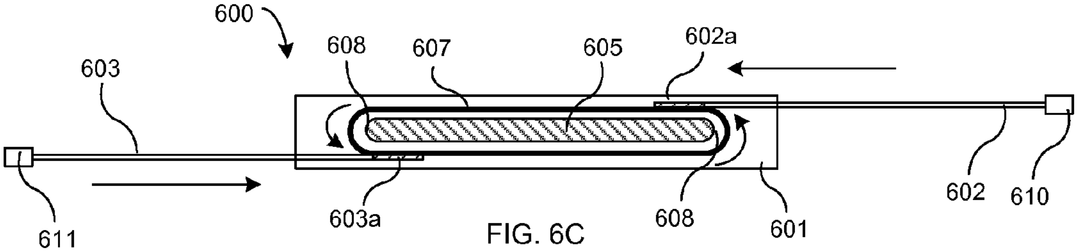
FIG. 6C is a cross sectional view of the pull-out measuring device of the seat marker assembly in an extracted position.
Figure 6D:
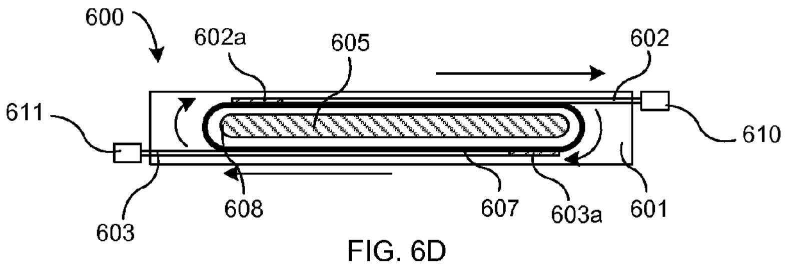
FIG. 6D is a cross sectional view of the pull-out measuring device of the seat marker assembly in an inserted position.

Upper backrest attachment portion 104 may further comprise a mechanism to aid in stabilizing and centering the upper backrest attachment portion 104 to a seat. As shown in FIGS. 6A-6D, upper backrest attachment portion 104 comprises a pull-out measuring device 600. FIG. 6B illustrates the top perspective view of the inner components of the measuring device 600, FIG. 6C illustrates a cross sectional side view of the inner components of the measuring device 600 in an expanded position, and FIG. 6D illustrates a cross sectional side view of the inner components of the measuring device 600 in a inserted position. Measuring device 600 comprises a channel 601 installed inside the inner portion 501 as shown in FIG. 5. Channel 601 may comprise plastic material. Referring back to FIGS. 6A-6C, two ruler portions 602 and 603 extend from channel 601 and comprise oppositely disposed hand grip portions 610 and 611. These ruler portions 602 and 603 assist in centering the upper backrest attachment portion 104 with the backrest of the seat. This ensures that the seat marker assembly 100 is centered and thereby stabilized on the seat. In a preferred embodiment, measuring device 600 comprises a pulley assembly such that pulling out ruler portion 602, also pulls out ruler portion 603, and vice versa. To achieve this, measuring device 600 comprises a flat track 605 with rounded ends 608 attached at its sides 605*a* and 605*b* to the side walls of the channel 601. Track 605 preferably comprises hard plastic material with smooth outer surface. Tape or band 607 extends closely around the perimeter of track 605 such that it circularly and freely rotates around track 605. In a preferred embodiment, band 607 comprises a smooth flexible plastic material. Ruler portion 602 attaches at its terminal end 602*a* to the upper portion and at a first end of band 607. Ruler portion 603 attaches at its terminal end 603*a* to the lower portion of band 607 at a second and opposite end of band 607. Ruler portions 602 and 603 are attached to the band 607 via adhesive or heat. Referring to FIG. 6C, pushing ruler portion 602 via hand grip 610 into channel 601 causes band 607 to rotate about track 605 in a counterclockwise direction and pull ruler portion 603 into channel 601 as shown in FIG. 6D. Referring to FIG. 6D, pulling ruler portion 603 via hand grip 611 out of the channel 601 causes band 607 to rotate about track 605 in a clockwise direction and push ruler portion 602 out of the channel 601.

Figure 7:
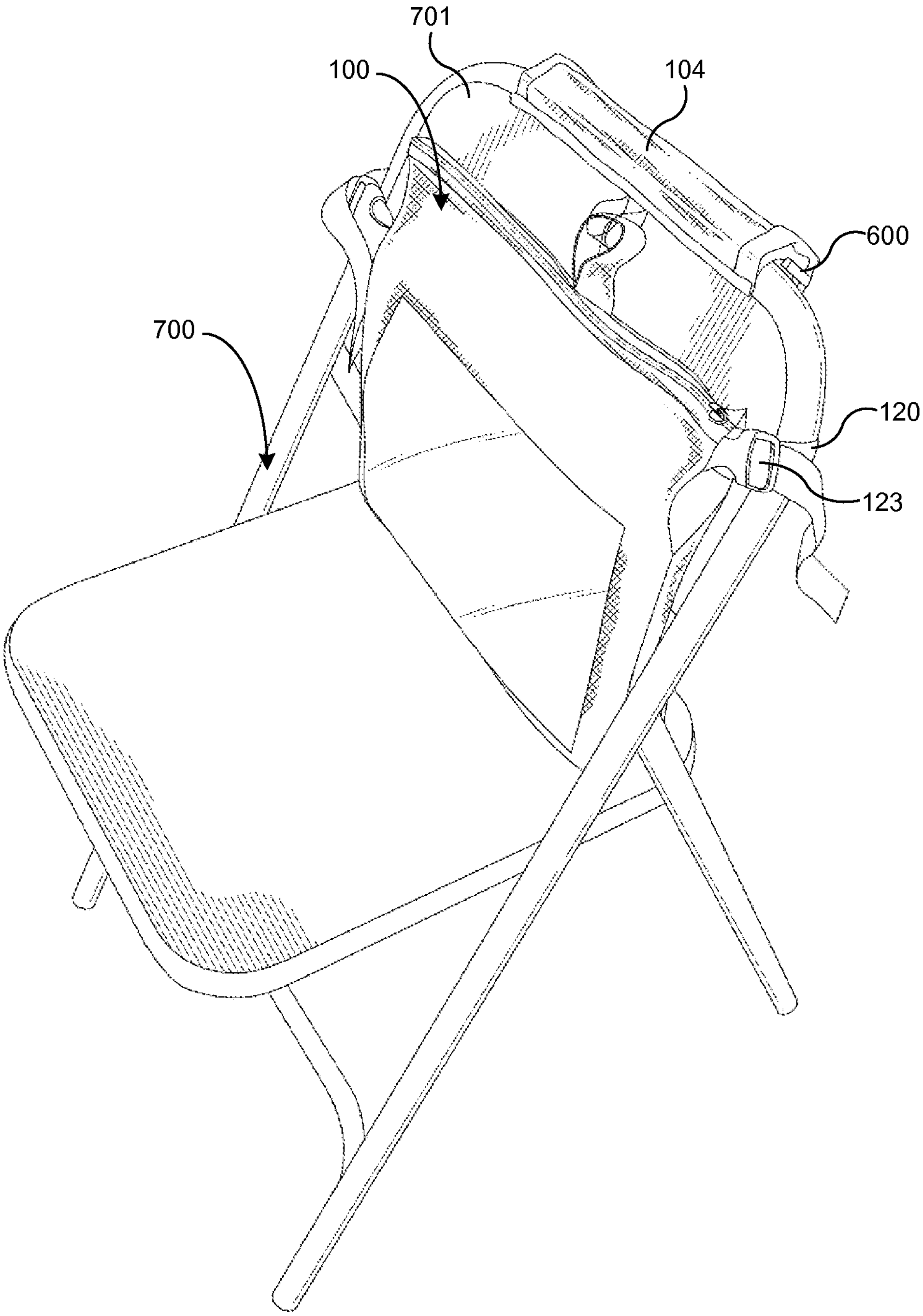
FIG. 7 is a perspective view of the seat marker assembly secured to a seat.

FIG. 7 illustrates the seat marker assembly 100 secured to a seat 700, comprising a backrest 701. To attach the seat marker assembly 100 to seat 700, the upper backrest attachment portion 104 is hooked on the upper portion of backrest 701 of seat 700. The pull-out measuring device 600 may be used to center the upper backrest attachment portion 104 on the upper portion of backrest 701 of seat 700. Then, seat strap 120 is secured and tightened around the backrest 701 via clips 123.

Figure 8:
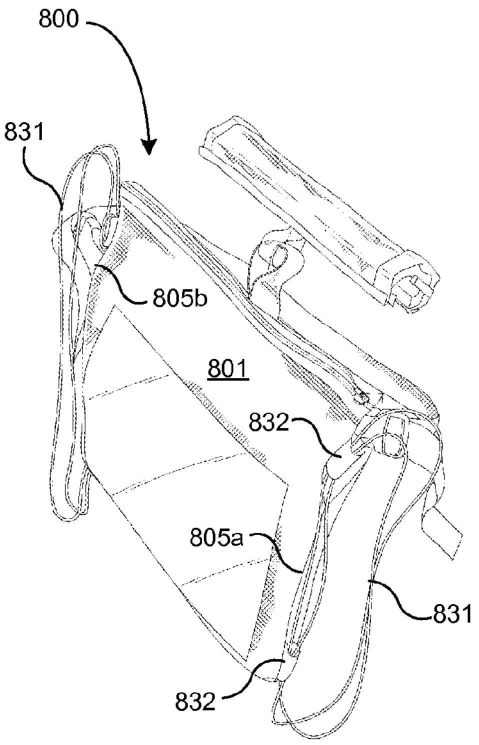
FIG. 8 is a front perspective view of a seat marker assembly provided with shoulder straps according to another embodiment of the present invention.
Figure 9:
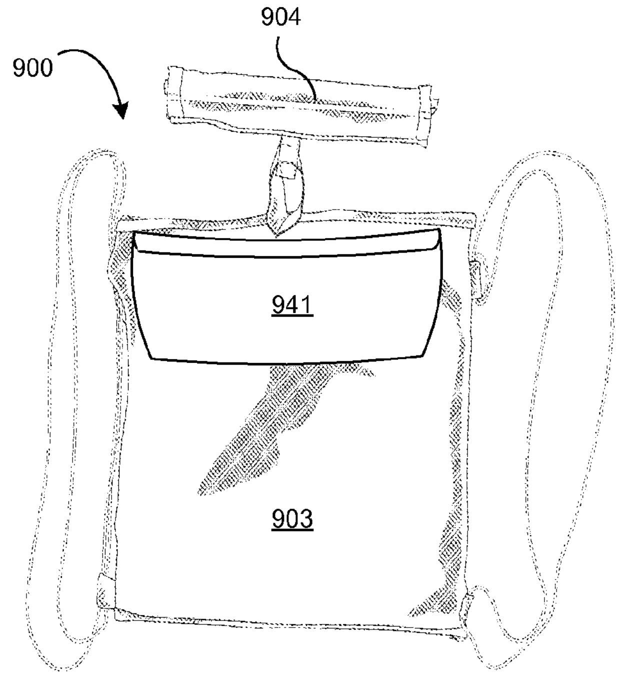
FIG. 9 is a rear view of a seat marker assembly provided with a pocket for retaining an upper backrest attachment portion according to another embodiment of the present invention.

Another embodiment of a seat marker assembly 800 is shown in FIG. 8. Seat marker assembly 800 may comprise shoulder straps 831 secured to the sides 805*a* and 805*b* of body 801 via elements of attachment 832. In this configuration, the user may carry the seat marker assembly 800 to and from the event. In another embodiment, as shown in FIG. 9, seat marker assembly 900 may comprise a pocket 941 on the upper portion of the rear panel 903. Alternatively, pocket 941 may be disposed on the front panel or inside body 101. Pocket 941 may be used to hold the upper backrest attachment portion 904 when it is not in use.

Figure 10A:
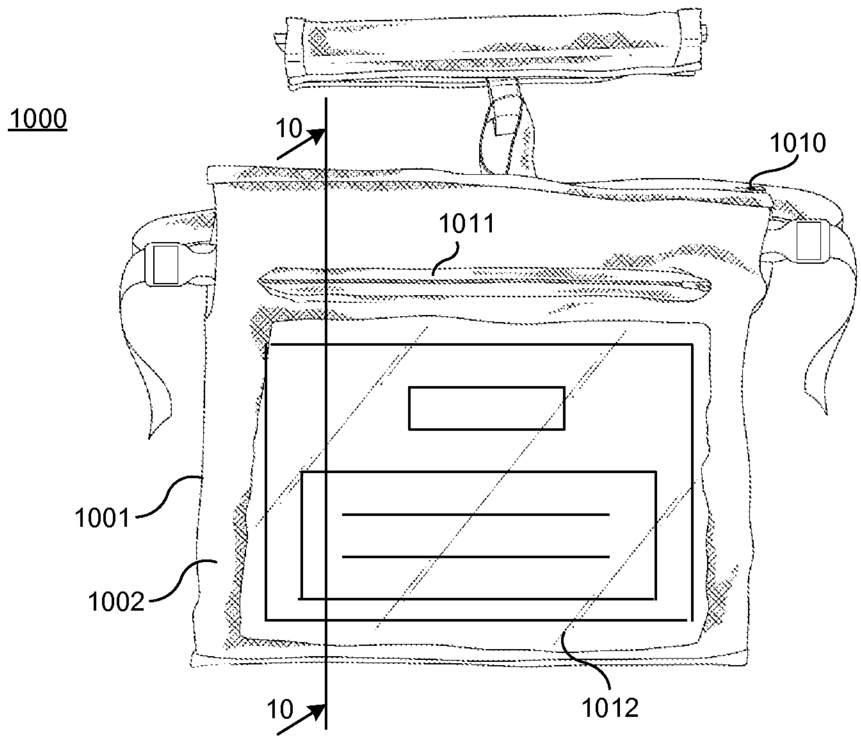
FIG. 10A is a front view of a seat marker assembly according to yet another embodiment.
Figure 10B:
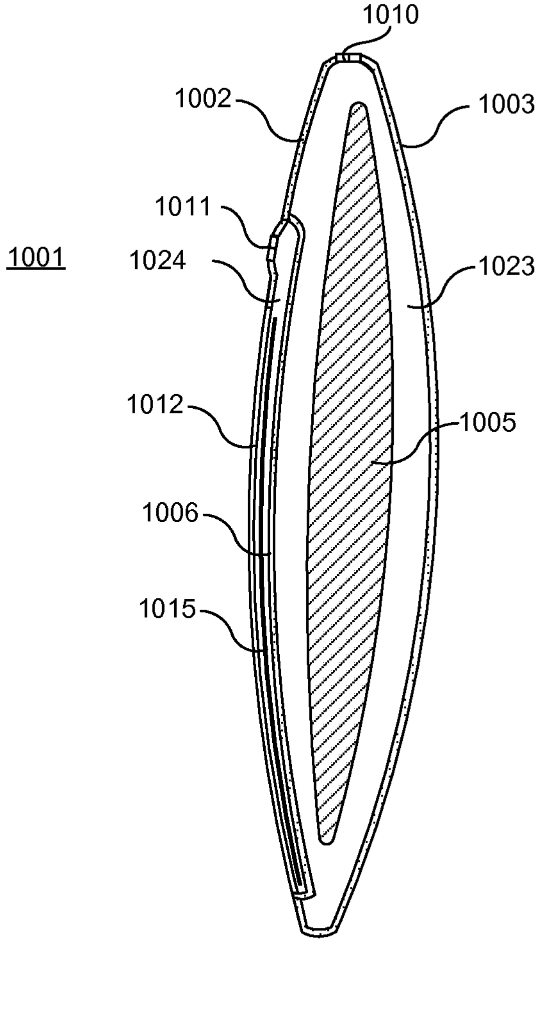
FIG. 10B is a cross sectional view of the seat marker assembly of FIG. 10A.

FIGS. 10A-10B show another embodiment of the seat marker assembly 1000. FIG. 10A shows the front view of the seat marker assembly 1000 and FIG. 10B shows a cross sectional view of body 1001 of the seat marker assembly 1000 along line 10 of FIG. 10A. Body 1001 of seat marker assembly 1000, according to this embodiment, comprises front panel 1002 and rear panel 1003, an upper zipper 1010, and window 1012 formed at the front panel 1002. Upper zipper 1010 is used to access compartment 1023. Compartment 1023 may be used to store cushion 1005 or other items. Internal panel 1006 is secured to the inside surface of front panel 1002 of body 1001 to separate compartment 1023 from compartment 1024 formed in body 1001. Specifically, compartment 1024 is formed between the front panel 1002 and internal panel 1006. Front zipper 1011 is provided on the front panel 1002 to access compartment 1024. Compartment 1024 is used to store personalized marker 1015.

Figure 11A:
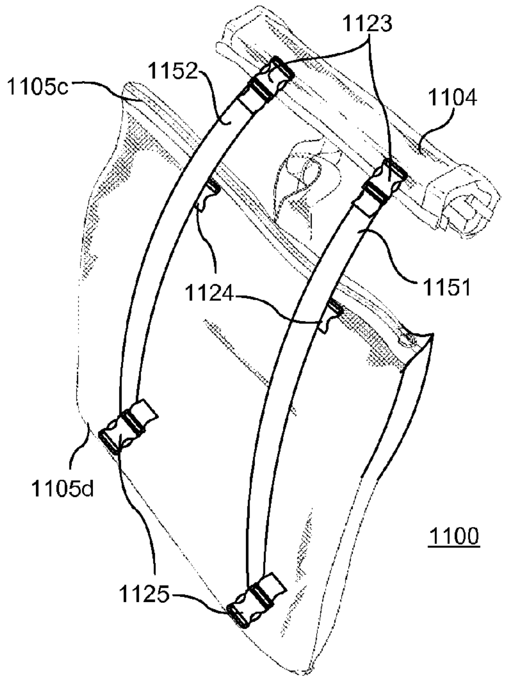
FIGS. 11A-11C are rear perspective views of a seat marker assembly provided with a pair or vertical straps according to another embodiment of the present invention.
Figure 11B:
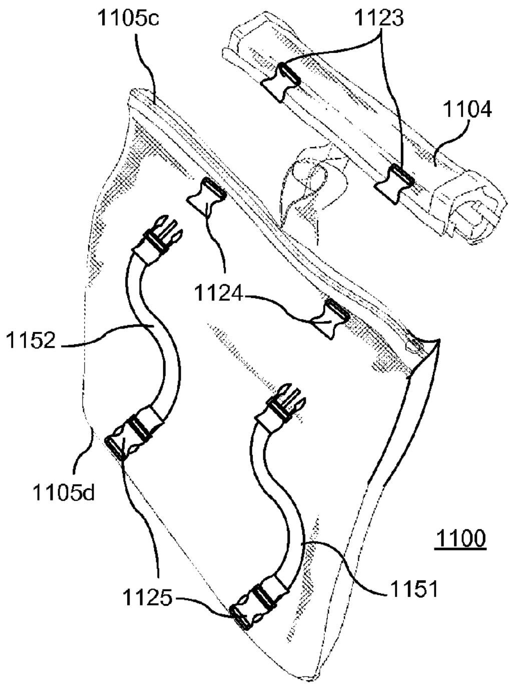
Figure 11C:
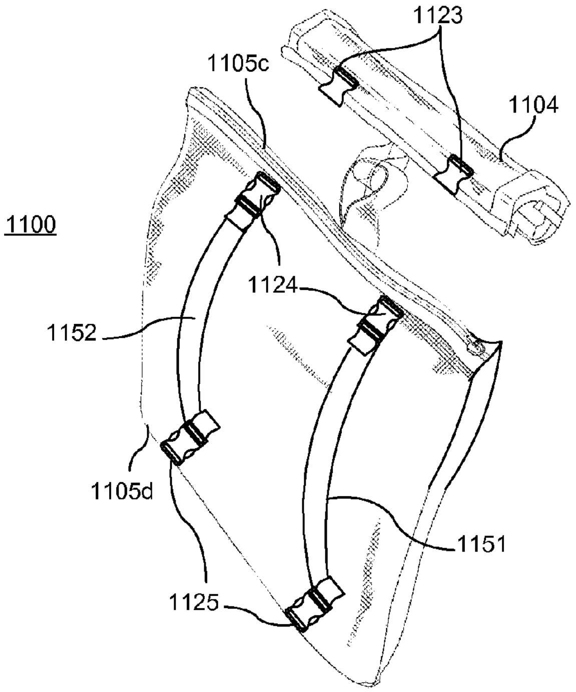

FIGS. 11A-11C illustrate an alternative embodiment of seat marker assembly 1100. Instead of comprising a horizontal seat strap 120, seat marker assembly 1100 comprises a pair of vertical straps 1151 and 1152. Seat marker assembly 1100 may be provided with a first pair of clips 1123 horizontally disposed on the upper backrest attachment portion 1104, a second pair of clips 1124 horizontally disposed on the upper end 1105*c* of body 1101, and a third pair of clips 1125 horizontally disposed on the lower end 1105*d* of body 1101. However, seat marker assembly 1100 may comprise fewer or additional clips for securing vertical straps 1151 and 1152. Vertical seat straps 1151 and 1152 may be secured at their first end to the lower end 1105*d* of body 1101 via third pair of clips 1125. The second and opposed ends of vertical seat straps 1151 and 1152 may be secured to either the upper end 1105*c* of body 1101 via second pair of clips 1124 or to the upper backrest attachment portion 1104 via first pair of clips 1123. Vertical straps 1151 and 1152 are used to secure seat marker assembly 1100 to the backrest of a seat. In addition, vertical straps 1151 and 1152 may serve as shoulder straps to carry the seat marker assembly 1100 to or from an event.

The seat marker assembly of the present invention may include other features without departing from the scope of the present invention. For example, the seat marker assembly may include additional pockets to hold personal items, such as a cell-phone, event ticket, water bottle, or the like. The seat marker assembly may further include a second body attached to the main body for providing cushion to the seat.

Figure 12:
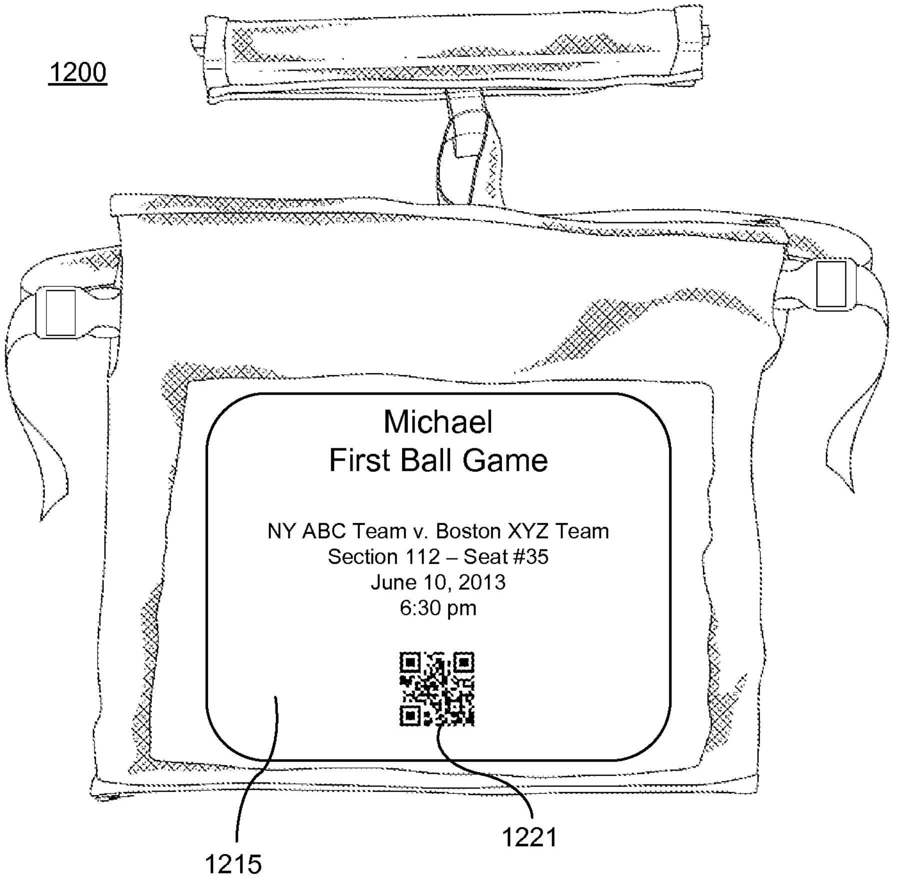
FIG. 12 is a front view of a personalized marker to be used with the seat marker assembly according to an embodiment of the present invention.

An embodiment of the personalized marker 1215 to be used with the seat marker assembly 1200 is illustrated in FIG. 12. As an example, the illustrated personalized marker 1215 is for use in a sporting event. In a preferred embodiment, the personalized marker 1215 is preordered and preprinted with personalized information before the event. In a preferred embodiment, personalized information includes information about the user and information about the event. Information about the user may include the user's name, photo, birth date, or the like. Information about the event may include the event location, date, time, or the like. As an example, a sporting event personalized marker 1215 may contain the attendee's name, the names of the teams playing at the match, the attendee's seat location, and date and time of the game. Other personalized information may further be included. When the user arrives at the event, the user picks up his personalized seat marker assembly 1200 and marker 1215 and attaches it to his seat at the event. In an alternative embodiment, the seat marker assembly 1200 is already attached to the user's seat upon the user's arrival to the event by the event coordinator. The personalized marker 1215 is preferably constructed of vinyl or any sufficiently pliable material, such as coated cotton, any type of plastic, weather proofed cotton or material, or the like. Further, the various components, wording, graphics, size, color, and shape of the personalized marker 1215 can vary depending on the seat composition, venue event, venue guidelines and the ticket holder/customer's/user's specifications.

In a preferred embodiment, the personalized marker 1215 further comprises a two dimensional barcode (e.g., a QR Code®) 1221, or any other machine-readable medium known in the art, such as a conventional barcode, a matrix barcode, a magnetic strip, a transponder device, a radio-frequency identifier (RFID), a microchip, or the like. Barcode 1221 may be scanned by the user's communication device, such as a smart phone, by the user at the event to access content association with the event. The barcode 1221 may be scanned using a scanner or a camera of the user's communication device. The user communication device may be equipped with other complementary technology to enable it to scan or detect a magnetic strip, a transponder device, a radio-frequency identifier (RFID), a microchip. Scanning barcode 1221 may allow a user to access a website associated with the event. Alternatively, scanning barcode 1221 may allow a user to access and download a mobile phone application or an app that will enhance the user's experience at or after the event. The website or the mobile phone application may offer the user to access information associated with the application to view content associated with the event, as well as various choices, including, for example, to upload and save photos, videos or other type of media taken from user's smart phone at the event. This will allow all attendees using the website and/or application to view and share all media captured and uploaded at the event. Upon the completion of the event, the system of the invention may send all attendees who scanned the application a complimentary video montage.

Figure 13:
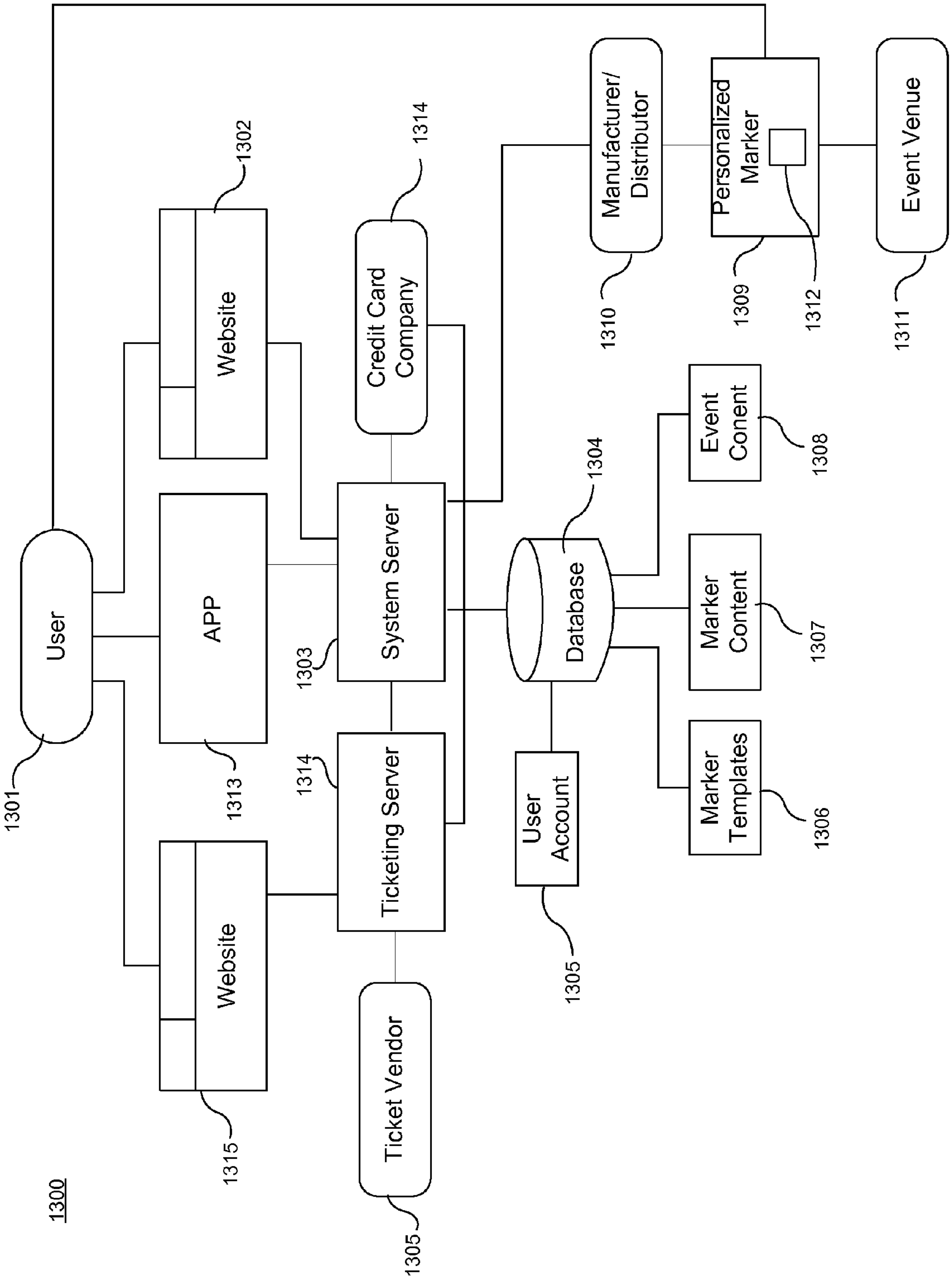
FIG. 13 is a schematic diagram illustrating the system of the present invention for ordering and personalizing the seat marker according to an embodiment of the present invention.

Referring to FIG. 13, there is shown a schematic diagram illustrating system 1300 of the present invention for ordering and personalizing the personalized seat marker for a ticketed event, such as a sporting event. However, system 1300 may be used for ordering and personalizing a seat marker for other types of events. System 1300 generally comprises a user communication device 1301 and a system server 1303 in communication for exchange of information required to order, personalize, and utilize a personalized marker 1309. User 1301 may access system 1300 via any communication device known in the art or later discovered, including, but not limited to a computer, personal computer, desktop computer, laptop computer, mobile device, handheld device, cellular telephone, smart phone, web-enabled cellular telephone, personal digital assistant, tablet, televisions or set top boxes supporting video on demand (VOD), interactive televisions, smart television, internet television, or the like. In a preferred embodiment, the user communication device comprises a display, a processor, a memory, a user interface (e.g., a touch screen, keyboard, mouse, voice recognition, or the like).

System 1300 preferably comprises a ticket vendor 1305 which allows user 1301 to purchase a ticket for an event—for example, a ticket for a sports game. Ticket vendor 1305 may operate a ticketing server 1314 and website 1315 through which the user 1301 may purchase tickets. After accessing the ticketing website 1315, the user 1301 may purchase a ticket for the event from the ticket vendor 1305. To make a payment for the ticket, the user 1301 is displayed a payment page via ticketing website 1315. The user may initiate a credit card transaction through a credit card company 1314 in communication with the ticketing server 1314.

After purchasing the ticket, the user 1301 may choose to personalize his experience by purchasing a personalize seat marker 1309. Alternatively, the personalize seat marker 1309 is included as part of the package with the ticket purchase. After placing the ticket order, the user may be redirected by the ticketing website 1315 to personalized marker website 1302 to purchase the personalized marker 1309. Alternatively, the user may be directed to access the personalized seat marker website 1302 through an advertisement received by mail, email, or another website, by word of mouth, or any other media. To order and personalize a personalized marker 1309, user 1301 accesses the personalized marker website 1302 to communicate with the system server 1303.

System server 1303 may comprise database 1304 for storing user account 1305, marker templates 1306, marker content 1307, event content 1308, or the like. System server 1303 may be operated by a personalized seat marker provider to provide the interface to the consumer to order a personalized seat marker. System server 1303 may be incorporated into a conventional standalone server, although in other embodiments, the function of the system server 1303 may be distributed across multiple computing systems and architectures. For example, system 1300 may include a separate web or app server as an interface between the user 1301 and system server 1303. System server 1303 may communicate with the ticketing server 1314 to receive information about the ticketed event and include that information on the personalized marker. Alternatively, user 1301 may purchase tickets directly from the system server 1303. System server 1303 is preferably a network server utilizing processing modules for processing information received. The system server 1303 and/or other system servers may include at least one controller or processing module (CPU or processor), at least one communications module port or hub, at least one random access memory module and one or more data storage modules. All of these latter elements are in communication with at least one processing module to facilitate the operation of the system 1300 of the present invention.

The information between system components may be transmitted across any network known in the art, or later discovered, including but not limited to wired, wireless, Internet, intranet, Ethernet, WAN (wide area network), LAN (local area network), virtual private network, Wi-Fi, WLAN (wireless local area network), cellular or mobile, GSM (Global System for Mobile Communications), CDMA (Code division multiple access), ISDN (Integrated Services Digital Network), Bluetooth, CATV (cable television), satellite, or the like. Network may include both wired and wireless connections, including optical links. It should also be appreciated that multiple networks may be used to transmit information between different system components, and that some or all of these networks may be private, dedicated networks in addition to the use of public networks such as the Internet. System server 1303 and database 1304 may include any one of numerous forms of storage devices and storage media, such as solid-state memory (RAM, ROM, PROM, and the like), magnetic memory, such as disc drives, tape storage, and the like, and/or optical memory, such as DVD.

In a preferred embodiment, the user interacts with website 1302 to create a user account 1305, which is stored on the system database 1304. The account allows user 1301 an opportunity to purchase, download, create and personalize a seat marker using photo images, uploaded or chosen from the website 1302. The user may personalize the seat marker 1309 by selecting a template from marker templates 1306, selecting marker content 1307 (such as team logos, etc.), and entering personal information. Personal information may include the user's name, photo, birth date, or the like. The user 1301 may further personalize marker 1309 by selecting font, color, theme, images, logos, etc. Alternatively, system server 1303 automatically creates and formats the seat marker 1309 based on the personal information entered by the user 1301 and based on the event selected by the user. System server 1303 may communicate with the ticketing server 1314 or any other server, including third-party servers, to receive information about the event. For example, the seat marker may include the name of the event, date of event, place of event, seat and/or section number. Once completed, the user may pay for the personalized seat marker 1309 via a payment page displayed on website 1302 (unless the user already paid for the seat marker with the purchase of the ticket).

After the user finalizes his or her order, the system server 1303 finalizes personalized marker 1309 and prepares it for printing. In addition, system server 1303 may generate barcode 1312 that may be associated with the system website 1302, a mobile phone application 1313, event content 1308, user account 1305, or combinations thereof. Barcode 1312 is used to further personalize the user's experience at the event. Personalized seat marker manufacturer or distributor 1310 may print the personalized marker 1309 and deliver the seat marker assembly of the present invention together with the personalized marker 1309 to an event venue 1311. When the user arrives at the event venue 1311, the user may pick up the seat marker assembly with the personalized marker 1309 at the ticket booth, or they may be already affixed to the user's ordered seat at the venue.

System 1300 also provides for user interaction via personalized marker 1309 at the event venue 1311. At the event, user may use the camera on his communication device 1301 to scan the barcode 1312 on the personalized marker 1309 and connect with system server 1303 to receive additional personalized experience at the event. Scanning barcode 1312 may enable the communication device 1301 to download a mobile phone application or app 1313 to enable user to easily communicate with server 1303 via app 1313. During the event, the consumer may upload media, including photos and videos, through the app on database 1304, which may be saved as event content 1308. The consumer may further access a third-party event content 1308 associated with the event, which may have been uploaded to the database 1304 by other users or by the event organizer. After the event, the consumer may log into the personalized marker website 1302 and may be given the opportunity to create a personalized memory book (e.g., a year book, photo album, etc.), create personalized montage of the event media, and/or download and print photos. In one embodiment, these photos, videos, and other media taken at the event may be saved for a limited period of time, for example, for 3 days at the conclusion of the event. In those 3 days, the attendees who scanned barcode 1312 may print out or locally store individual photos before all photos of that event are permanently erased.

Figure 14:
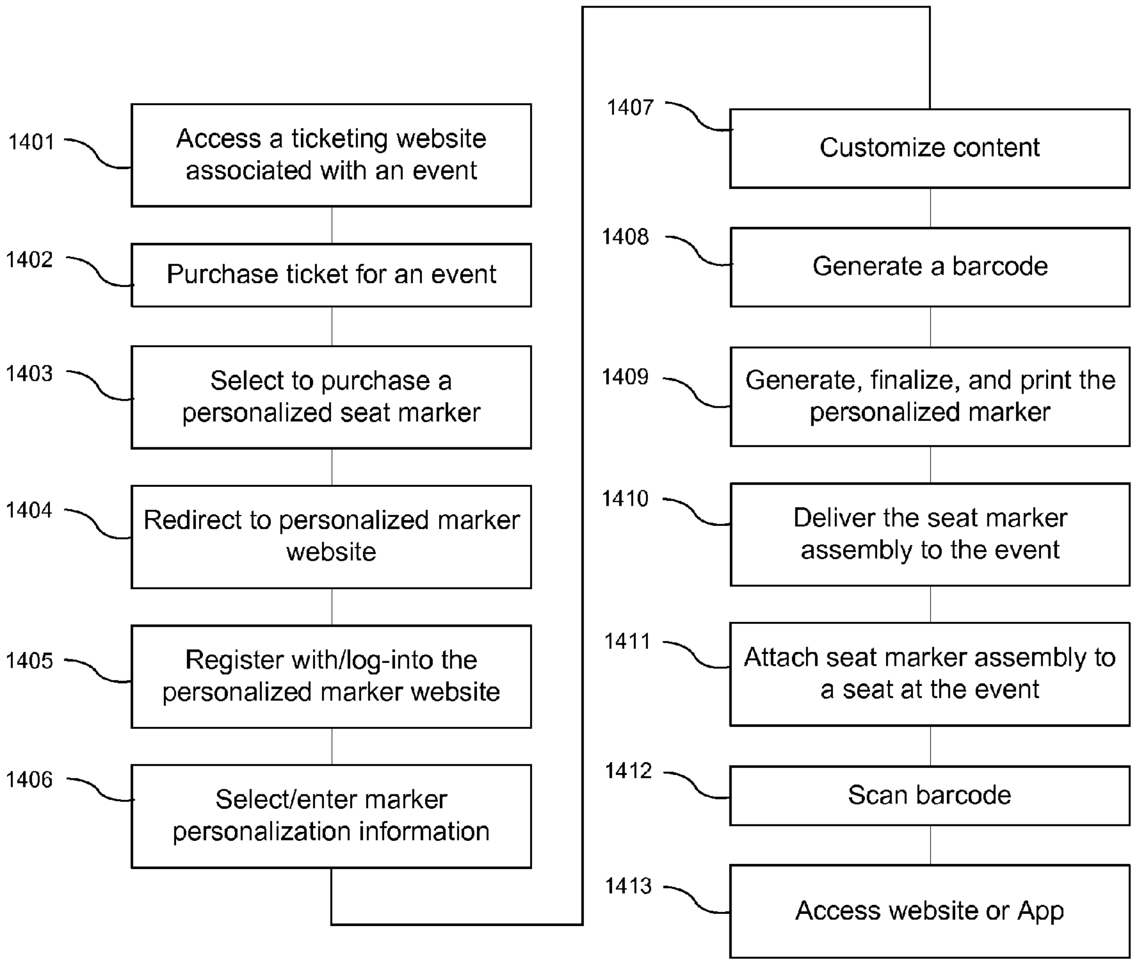
FIG. 14 illustrates an exemplary method for creating, ordering, and using the personalized marker of the present invention according to an embodiment of the present invention.

FIG. 14 illustrates an exemplary method for creating, ordering, and using the personalized marker of the present invention, for example for a sporting event. In step 1401, the user accesses a ticketing website associated with the sporting event. In step 1402, the user selects the event and purchases a ticket for the event, in this scenario a sporting event. The sporting event may be any sporting event, including, but not limited to professional, high school, college, tournament, or little league, and of either gender. In step 1403, the user selects to purchase a personalized seat maker for the event. The user is then redirected to a personalized marker website in step 1404 to purchase a personalized seat marker. In step 1405, the user either registers with the website to create an account or logs into the website if he or she has an already created and stored account. In step 1406, the user enters personalization information to be included on the seat marker. For example, the user may enter his or her name, select theme, templates, font, color, images, logos, or the like. In addition, the user may choose the seat marker assembly to be embroidered with personalized information, such as initials.

In step 1407, the user may enter information to customize the content that will be available to the user during the event. For example, the user may select the team the user is rooting for, a favorite athlete, the content the user would like to see during the game, for example, audio of the announcers, a score board, or the like. In step 1408, a barcode is generated. In a preferred embodiment, the barcode is linked to the personalized marker website or a mobile phone application or app. The barcode may be further linked to the user's personal account so as to provide personalized/customized experience at the event. In step 1409, the personalized marker is generated, formatted, and printed by the personalized marker vendor. As described above, the personalized marker of the present invention may be printed with the user's information, event information, and various images or messages selected by the user. The system may communicate with the ticketing vendor to receive information about the event.

The seat marker assembly together with the personalized marker is then delivered to the event venue in step 1410. In step 1411, the seat marker assembly is attached to a seat at the event, either by the user or the event organizer. In step 1412, the barcode on the seat marker is scanned via the user's communication device. This causes the communication device to access a website or download a mobile phone application in step 1413. In addition to accessing general event content via website or app at the event, the event content may be personalized to the user's preferences based on the information the user has entered when ordering the seat marker. Furthermore, the barcode may directly link the user to the personalized content and/or to the user account. For example, during the sporting event, the user may scan the barcode to download the system app and to view the selected athlete's personal profile, including photo, media, video, stats, and highlights. The system app may further provide to the user up-to-date information on the game. During the event, the user may further upload media to the app, including photos and videos. As described above, after the event, the user may log-into his or her account via the system website and may be given the opportunity to create a personalized memory book (e.g., a year book, photo album, etc.), create personalized montage of the event media, and/or download and print photos.

The following examples illustrate the operation of the personalized seat marker at various additional events and occasions:

Celebratory Events (e.g., Birthdays, Anniversaries, Etc.)

Prior to a celebratory event, such as a birthday, the event organizer may order a plurality of personalized seat markers for his or her guests. The personalized seat markers may contain information associated with the event, for example, the date of the event, the honoree's names, other information about the honoree, individual guest's information (name, etc.), and a barcode. At the event, the event organizer may affix the personalized seat markers onto the seats of the event to provide personalized experience to the guests. The seat marker may also contain personalized guest information and serve as a seating card for the guests. Guests may scan the barcode with their communication devices, which causes the communication devices to download an app or be directed to a website associated with the event. Guest may upload to the app or website photos and videos taken at the event. After the event, the event organizer and/or the attendees may access the uploaded content and create a montage. The event organizer may create and send the content montage to attending guests as a "Thank You" gift. In addition, guests may leave text, voice, video, or other type of messages to the honoree of the event, such as birthday wishes. Alternatively, or in addition, guests may access voice and video message from the host, which plays once the barcode is scanned. As another embodiment, the personalized marker and/or the barcode may be included on an invitation, event program, seating card, card or label of a favor, name tag label, or the like. Using the content uploaded at the event, the honoree or guests may create personalized memory books of the event.

Wedding

The system of the present invention is a great implement to keep the bridal couple's photos, cards, and guest's wishes in one place. The system is customizable to fit any wedding theme. Prior to the wedding event, the bridal couple may purchase a system package on the system website, which includes a wedding webpage, a customized barcode that links to the wedding webpage, two seat marker assemblies, wedding invitations, seat cards, and/or favor cards or labels, all printed with the customized barcode. Bride and groom may customize the content linked to their customized barcode. For example, they may create video message(s) for the guests.

The system then prepares and ships the invitations to the wedding guests. Barcodes on the wedding invitation may link guests to an RSVP page, allowing guest to RSVP to the wedding event. The wedding invitation barcode may also link the guests to a personalized video message from the bride and groom welcoming the guests to the wedding ceremony and reception.

Two personalize seat marker assemblies are prepared and shipped to the bridal party to be installed on the bride's and the groom's seats at the reception. The bridal seat marker assemblies comprise personalized markers with barcodes that link the bridal couple to their wedding webpage. Upon receiving the seat marker assemblies, the bride and groom may scan the barcode thereon to upload photos or videos to the wedding website from all wedding related events prior to the reception, such as the rehearsal dinner, wedding preparation, or wedding ceremony.

Upon arrival to the reception, guests can scan the barcode from their respective seating cards (or a card or label included with the favor). The barcodes on the customizable guest seating cards allow guests to access the wedding app or website and to upload photos, videos, or messages to the app or website. Guests can use their phone to record video messages to the bride and groom and upload these messages to the wedding webpage. In addition, a welcome message from the bride and groom may play on guests' phones upon scanning of the barcodes. The barcodes also allow guest access to all the media uploaded to the wedding page during the event.

After the wedding, the bride and groom may create and customize a media montage using the guest uploaded media, customized photo "Thank You" cards, or to send an electronic video "Thank You" cards to the guests phones. In addition, guests may access the wedding page and download pictures, create memory books and/or view photos, and download bride and groom complimentary message and montage.

Graduation

A graduating student, or his family, may order a personalized seat marker for the graduating student, and/or for the individuals attending the graduation event. The personalized seat marker may include personal information about the graduating student, the date of the graduation, a photo of the student, school name, student's achievements, or the like. The personalized seat marker also preferably includes a barcode linked to an app or a webpage associated with the graduation event. As such, the system of the present invention offers graduating students an opportunity to personalize their graduation seat, to allow parents and family to send congratulatory messages, and forever memorialize their graduation experience for little or no cost to the graduating student. Graduating students, as well as the attendees, may upload photos, videos, messages, or other media to the app or website associated with the barcode. After the graduation, the graduating student, family, and friends may access the media uploaded during the graduation. This also allows the student, the school, family, or friends to create a virtual year book, where the photos of the students may be tagged.

In one embodiment, the seat marker assembly of the present invention is installed on the graduating student's seat on the graduation day. The personalized marker is placed inside and displayed through the window of the seat marker assembly. The student barcode displayed on the personalized marker is swiped by a communication device of the student at the start of their school graduation to access a graduation app or website specifically created for their graduating class. Thereafter students may upload any or all of the pictures taken from their smart phone to the graduation website. After graduation, the graduation website can include images of the student's diploma, a yearbook, and other event memorabilia, including caps and gowns. The student may log into to the graduation website to create a personal graduation page and/or virtual yearbook. The student may use the app or website to upload graduation messages to their classmates' graduation pages, sign pictures on their classmates' graduation pages, upload music and photos or clip art to their graduation page, and download virtual yearbook and graduation pages.

The system of the present invention may further offer a graduation fundraising application, which allows students to defer the cost of the personalized seat markers and/or defer some or all of the costs of the graduation. Business or family sponsors may post free advertisement on the graduation website to provide funds. In addition, graduation attendees, including family members, friends, or business sponsors, may be provided with a seat marker assembly or with a graduation marker card printed with a barcode to link the sponsor with the graduation app or website. The attendees may scan the card with their smart phone and follow instructions to place a congratulatory message to the graduating student on the graduation page. The message may be played back at the graduation over the student's cell phone once the student swipes the barcode located on his graduation seat. Sponsoring attendees may further be linked via the barcode to a payment webpage where they can provide funds to the graduation fund.

It should be understood that this invention is not limited to the disclosed features and other similar method and system may be utilized without departing from the spirit and the scope of the invention.

While the invention has been described with reference to the preferred embodiment and alternative embodiments, which embodiments have been set forth in considerable detail for the purposes of making a complete disclosure of the invention, such embodiments are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention. It should be appreciated that the invention is capable of being embodied in other forms without departing from its essential characteristics.

The invention claimed is:

1. A seat marker assembly for personalizing a user's seat at an event, the seat marker assembly comprises:

a body comprising a front panel and a rear panel forming at least one enclosed compartment therein, wherein the front panel comprises a clear window;

at least one seat strap connected to the body for securing the body to the seat;

an upper backrest attachment portion attached to an upper end of the body for securing the upper backrest attachment to an upper portion of a backrest of the seat; and a personalized marker displayed through said clear window, wherein said personalized marker is printed with information about said user and information about said event.

2. The seat marker assembly of claim 1, wherein the upper backrest attachment portion is attached to the body via a pair of interconnected loops or a band.

3. The seat marker assembly of claim 1, wherein the body comprises at least one zipper disposed at the front panel, the rear panel, an upper end of the body, or a lower end of the body, to access said enclosed compartment.

4. The seat marker assembly of claim 1, wherein said window encompasses substantially the majority of the front panel.

5. The seat marker assembly of claim 1, wherein said at least one seat strap extends horizontally across the body from a first side to a second side of the body.

6. The seat marker assembly of claim 1, wherein said at least one seat strap comprises a pair of vertical straps extending vertically across the body from a lower side of the body to an upper side of the body or to the upper backrest attachment portion.

7. The seat marker assembly of claim 1, wherein said at least one seat strap removably attaches to the body via pair of clips, buckles, female and male side-squeeze plastic buckles, snap buckles, hell bar buckles, release buckles, cam buckles, or any combination thereof.

8. The seat marker assembly of claim 1, wherein said at least one seat strap adjusts in length, comprises an elastic material, or a combination thereof.

9. The seat marker assembly of claim 1, further comprises at least one removable cushion within said at least one enclosed compartment.

10. The seat marker assembly of claim 1, wherein said body further comprises a zipper at a lower side of the body and an internal storage bag within said enclosed compartment, wherein the internal storage bag is pulled out from the enclosed compartment of the body by unzipping the zipper at the lower side of the body.

11. The seat marker assembly of claim 1, wherein said body further comprises an inner divider panel disposed between the front panel and the rear panel, wherein the inner divider panel divides the at least one enclosed compartment into two separate compartments.

12. The seat marker assembly of claim 1, wherein said upper backrest attachment portion is hook shaped that radially extends from a first end to a second end.

13. The seat marker assembly of claim 1, wherein said upper backrest attachment portion comprises a measuring device, comprising:

a channel located inside the upper backrest attachment portion;

a first ruler portion extending from a first end of the channel; and a second ruler portion extending from a second end of the channel.

14. The seat marker assembly of claim 13, wherein said measuring device comprises a pulley to enable the first and second ruler portions to extend from the channel.

15. The seat marker assembly of claim 1, wherein said body comprises a pair of shoulder straps extending from an upper side to a lower side of the body.

16. The seat marker assembly of claim 1, wherein said body comprises a pocket disposed on the front or rear panel for retaining the upper backrest attachment portion when it is not in use.

17. The seat marker assembly of claim 1, wherein the personalized marker comprises a machine-readable medium.

18. The seat marker assembly of claim 17, wherein the machine-readable medium is selected from the group consisting of, a barcode, a two dimensional barcode, a magnetic strip, a microchip, a transponder device, an RFID, or any combination thereof.

19. The seat marker assembly of claim 17, wherein the machine-readable medium contains information about a website, wherein upon scanning the machine-readable medium with a communication device of the user, the communication device is directed to the website.

20. The seat marker assembly of claim 19, wherein said website contains information associated with the event, the user, the personalized marker, or any combination thereof.

21. The seat marker assembly of claim 17, wherein the machine-readable medium contains information associated with a mobile phone application, wherein upon scanning the machine-readable medium with a mobile phone of the user, the mobile phone downloads said application.

22. The seat marker assembly of claim 21, wherein said mobile phone application contains information associated with the event, the user, the personalized marker, or any combination thereof.

23. A seat marker assembly for personalizing a user's seat at an event, the seat marker assembly comprises:

a body comprising a front panel and a rear panel forming at least one enclosed compartment therein, wherein the front panel comprises a clear window;

at least one attachment portion for securing the body to the seat; and a personalized marker displayed through said clear window, wherein said personalized marker comprises information about said user, information about said event, and a machine-readable medium.

24. A seat marker assembly for personalizing a user's seat at an event, the seat marker assembly comprises:

a body comprising a front panel and a rear panel forming at least one enclosed compartment therein, wherein the front panel comprises a clear window;

at least one attachment portion for securing the body to the seat; and a personalized marker displayed through said clear window, wherein said personalized marker comprises information about said user, information about said event, and a machine-readable medium;

wherein upon scanning the machine-readable medium with a communication device of the user, the user accesses information associated with the event, the user, the personalized marker, or any combination thereof.

* * * * *